(12) United States Patent
Mei et al.

(10) Patent No.: US 9,977,975 B2
(45) Date of Patent: May 22, 2018

(54) TRAFFIC LIGHT DETECTION USING MULTIPLE REGIONS OF INTEREST AND CONFIDENCE SCORES

(71) Applicant: Toyota Motor Engineering & Manufacturing North America, Inc., Erlanger, KY (US)

(72) Inventors: Xue Mei, Ann Arbor, MI (US); Katsuhiro Sakai, Ann Arbor, MI (US); Danil V. Prokhorov, Canton, MI (US); Michael J. Delp, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 100 days.

(21) Appl. No.: 15/240,112

(22) Filed: Aug. 18, 2016

(65) Prior Publication Data
US 2018/0053059 A1   Feb. 22, 2018

(51) Int. Cl.
*G06K 9/00* (2006.01)
*G06K 9/20* (2006.01)
(Continued)

(52) U.S. Cl.
CPC ....... *G06K 9/00825* (2013.01); *G06K 9/2063* (2013.01); *G06K 9/623* (2013.01);
(Continued)

(58) Field of Classification Search
CPC .. G06K 9/00825; G06K 9/2063; G06K 9/623; G06K 9/6262; G06K 9/627; G06K 9/6277; G06T 7/408; G06T 2207/30252
See application file for complete search history.

(56) References Cited

U.S. PATENT DOCUMENTS

| 8,818,043 B2 | 8/2014 | Fairfield et al. |
| 2009/0225189 A1* | 9/2009 | Morin .................... H04N 5/345 348/229.1 |

(Continued)

FOREIGN PATENT DOCUMENTS

| JP | 2016-038757 A | 3/2016 |
| JP | 2016-042226 A | 3/2016 |

OTHER PUBLICATIONS

Chen et al., "Automatic Detection of Traffic Lights Using Support Vector Machine", 2015 IEEE Intelligent Vehicles Symposium (IV), Jun. 28-Jul. 1, 2015, COEX, Seoul, Korea, 4 pages.
(Continued)

*Primary Examiner* — Shefali Goradia
(74) *Attorney, Agent, or Firm* — Christopher G. Darrow; Darrow Mustafa PC

(57) ABSTRACT

Described herein is a device for traffic light detection. The device comprises a memory and a traffic light detection module. The memory may store information, the information comprising first traffic light data of a first traffic light and second traffic light data of a second traffic light. The traffic light detection module may receive an image comprising a first candidate and a second candidate; determine a first region of interest based, at least in part, on the first traffic light data, the first region of interest comprising the first candidate; determine a second region of interest based, at least in part, on the second traffic light data, the second region of interest comprising the second candidate; and determine a confidence score for a first state of the first candidate, the confidence score based, at least in part, on a spatial relationship factor between the first candidate and the second candidate.

20 Claims, 5 Drawing Sheets

(51) Int. Cl.
*G06T 7/40* (2017.01)
*G06K 9/62* (2006.01)
(52) U.S. Cl.
CPC ........... *G06K 9/627* (2013.01); *G06K 9/6262* (2013.01); *G06K 9/6277* (2013.01); *G06T 7/408* (2013.01); *G06T 2207/30252* (2013.01)

(56) References Cited

U.S. PATENT DOCUMENTS

| | | | |
|---|---|---|---|
| 2013/0253754 A1* | 9/2013 | Ferguson | G05D 1/0231 701/28 |
| 2015/0210275 A1 | 7/2015 | Huberman | |
| 2015/0210277 A1 | 7/2015 | Ben Shalom | |
| 2015/0210278 A1 | 7/2015 | Ben Shalom et al. | |
| 2015/0332097 A1* | 11/2015 | Bulan | G06K 9/6267 382/103 |

OTHER PUBLICATIONS

Gomez et al., "Traffic Lights Detection and State Estimation Using Hidden Markov Models", 2014 IEEE Intelligent Vehicles Symposium (IV), Jun. 8-11, 2014, Dearborn, Michigan, USA, 6 pages.
Levinson et al., "Traffic Light Mapping, Localization, and State Detection for Autonomous Vehicles", 2011 IEEE International Conference on Robotics and Automation, Shanghai International Conference Center, May 9-13, 2011, Shanghai, China, 8 pages.
Fairfield et al., "Traffic Light Mapping Detection", 2011 IEEE International Conference on Robotics and Automation, Shanghai International Conference Center, May 9-13, 2011, Shanghai, China, 6 pages.

* cited by examiner

US 9,977,975 B2

TRAFFIC LIGHT DETECTION USING MULTIPLE REGIONS OF INTEREST AND CONFIDENCE SCORES

TECHNICAL FIELD

The subject matter described herein relates in general to traffic light detection, and more particularly, to traffic light detection using multiple regions of interest and confidence scores.

BACKGROUND

Traffic light detection systems identify individual regions of interest for each traffic light at an intersection. The traffic light detection system attempts to determine a state of the traffic light in one of the regions of interest based solely on that traffic light and region of interest. Regions of interest typically are not permitted overlap.

SUMMARY

An embodiment described herein is a device for traffic light detection comprising: a memory configured to store information, the information comprising first traffic light data of a first traffic light and second traffic light data of a second traffic light; and a traffic light detection module configured to: receive an image comprising a first candidate and a second candidate; receive the first traffic light data and the second traffic light data; determine a first region of interest based, at least in part, on the first traffic light data, the first region of interest comprising the first candidate; determine a second region of interest based, at least in part, on the second traffic light data, the second region of interest comprising the second candidate; determine a first confidence score for a first state of the first candidate, the first confidence score based, at least in part, on a first spatial relationship factor between the first candidate and the second candidate.

Another embodiment described herein is a method for traffic light detection, the method comprising: storing information comprising first traffic light data of a first traffic light and second traffic light data of a second traffic light; receiving an image comprising a first candidate and a second candidate; receiving the first traffic light data and the second traffic light data; determining a first region of interest based, at least in part, on the first traffic light data, the first region of interest comprising the first candidate; determining a second region of interest based, at least in part, on the second traffic light data, the second region of interest comprising the second candidate; and determining a first confidence score for a first state of the first candidate, the first confidence score based, at least in part, on a first spatial relationship factor between the first candidate and the second candidate.

Another embodiment described herein is a method for traffic light detection, the method comprising: receiving an image comprising a first candidate and a second candidate; receiving first traffic light data of a first traffic light and second traffic light data of a second traffic light; determining a first region of interest based, at least in part, on the first traffic light data, the first region of interest comprising the first candidate; determining a second region of interest based, at least in part, on the second traffic light data, the second region of interest comprising the second candidate; determining a first spatial relationship factor between the first candidate and the second candidate; determining a first probability that the first candidate is in a first state; determining whether the first candidate satisfies a first rule; determining a state transition probability of the first candidate; and determining a first confidence score based, at least in part, on the first spatial relationship factor, the first probability, whether the first candidate satisfies the first rule, and the state transition probability, wherein the first confidence score indicates a confidence that the first candidate is in the first state.

BRIEF DESCRIPTION OF THE DRAWINGS

FIG. 1 is a diagram of an embodiment of a view from a vehicle approaching traffic signals at a curve in a road that the vehicle is travelling on.

DETAILED DESCRIPTION

Described herein is a system and method for traffic light detection using multiple regions of interest. A traffic light detection system may include a camera or other image capture device and a traffic light detection module for receiving an image from the camera or other image capture device of an area with possible traffic signals (e.g., an upcoming intersection). The traffic light detection module may receive the image and determine several regions of interest in the image where traffic lights may be present. The regions of interest may be determined based upon previously stored information related to the position of traffic lights at the location depicted in the image. The traffic light detection module may identify candidates within each region of interest. A candidate may be a portion of the image that could be a traffic light. The traffic light detection module may then determine a confidence score for each of the candidates. The confidence score may be determined using spatial relationships between the candidate under evaluation and another candidate in another region of interest. The confidence score may be determined using other factors in addition to the spatial relationships. The state of an upcoming traffic light depicted in the image may be determined based upon the candidates with the highest confidence scores. Thus, candidates from multiple regions of interest may be considered in combination when determining the state of an upcoming traffic signal. In other embodiments, spatial relationships may be considered when detecting other types of objects, e.g., lane markers, or some other objects that have a previously known spatial relationship. In these other embodiments, the confidence score may be determined for the other types of objects similar to the manner in which a confidence score is determined for a traffic light.

Figure 1:
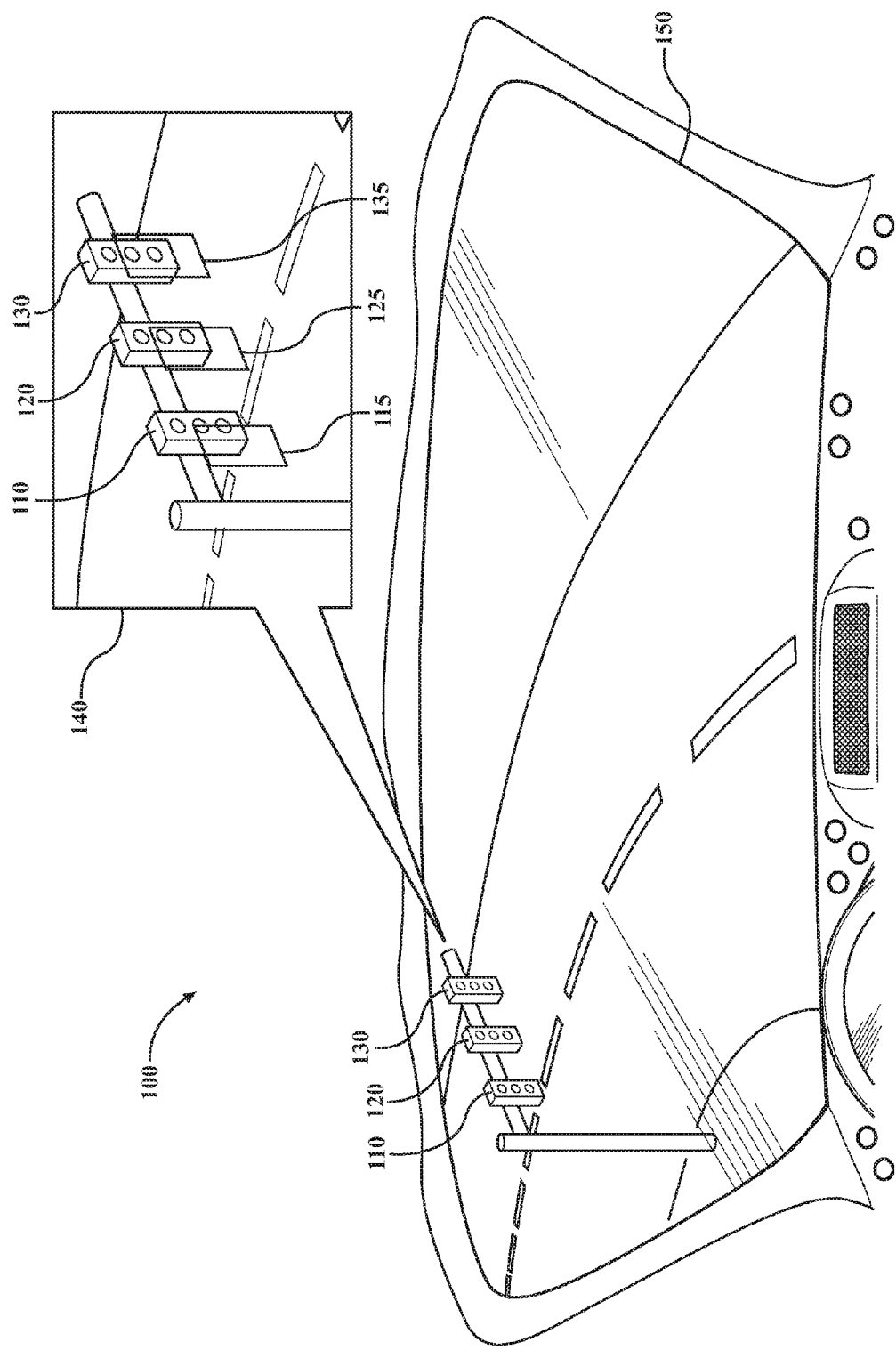

FIG. 1 is a diagram of an embodiment of a view 100 from a vehicle approaching traffic signals at a curve in a road that the vehicle is travelling on. A camera or other image capture device may capture the image 150 of the upcoming roadway. Image 150 may depict one or more traffic signals. In this case, traffic signals 110, 120, and 130 are in the image 150.

Magnification 140 depicts a magnification of the image of the area around the traffic signals 110, 120, and 130. A traffic light detection module of the vehicle may create a region of interest in an attempt to detect the state of the traffic signals 110, 120, and 130. In this case, three regions of interest 115, 125, and 135 may be created by the traffic light detection module. Regions of interest 115, 125, and 135 may be determined based on previously stored information about the traffic lights depicted in image 150. For example, locations of traffic signals 110, 120, and 130 may have been previously mapped and regions of interest 115, 125, and 135 may have been associated with locations on the map. Regions of interest 115, 125, and 135 may be shifted so that they do not encompass the traffic signals 110, 120, and 130. The shift may be due to the curve in the road and/or the size of the regions of interest 115, 125, and 135. A curve in the road may cause the yaw angle between the traffic signals 110, 120, and 130 and the regions of interest 115, 125, and 135 to shift. The shift may cause the traffic light detection module to not detect traffic signals 110, 120, and 130.

Figure 2:
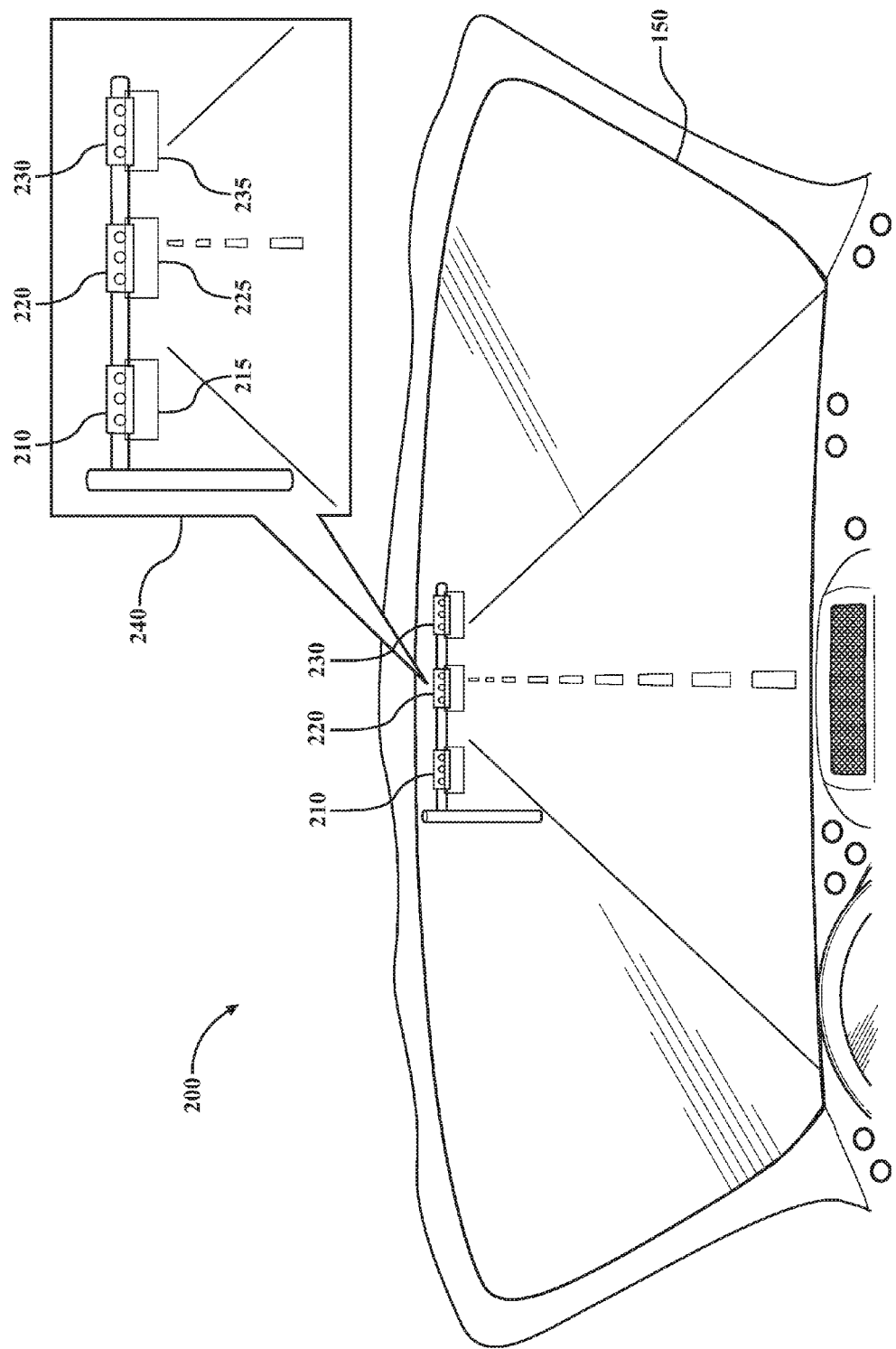
FIG. 2 is a diagram of an embodiment of a view from a vehicle approaching traffic signals at a long distance.

FIG. 2 is a diagram of an embodiment of a view 200 from a vehicle approaching traffic signals at a long distance. A camera or other image capture device may capture the image 250 of the upcoming roadway. Image 250 may depict one or more traffic signals. In this case, traffic signals 210, 220, and 230 are in the image 250. Magnification 240 depicts a magnification of the image of the area around the traffic signals 210, 220, and 230. A traffic light detection module of the vehicle may create a region of interest in an attempt to detect the state of the traffic signals 210, 220, and 230. In this case, three regions of interest 215, 225, and 235 may be created by the traffic light detection module. Regions of interest 215, 225, and 235 may be determined based on previously stored information about the traffic lights depicted in image 250. Regions of interest 215, 225, and 235 may be shifted so that they do not encompass the traffic signals 210, 220, and 230. The shift may be due to a bump in the road and/or the size of the regions of interest 115, 125, and 135. A bumpy road may cause the pitch angle between the traffic signals 210, 220, and 230 and the regions of interest 215, 225, and 235 to shift. The shift may cause the traffic light detection module to not detect traffic signals 210, 220, and 230.

Figure 3:
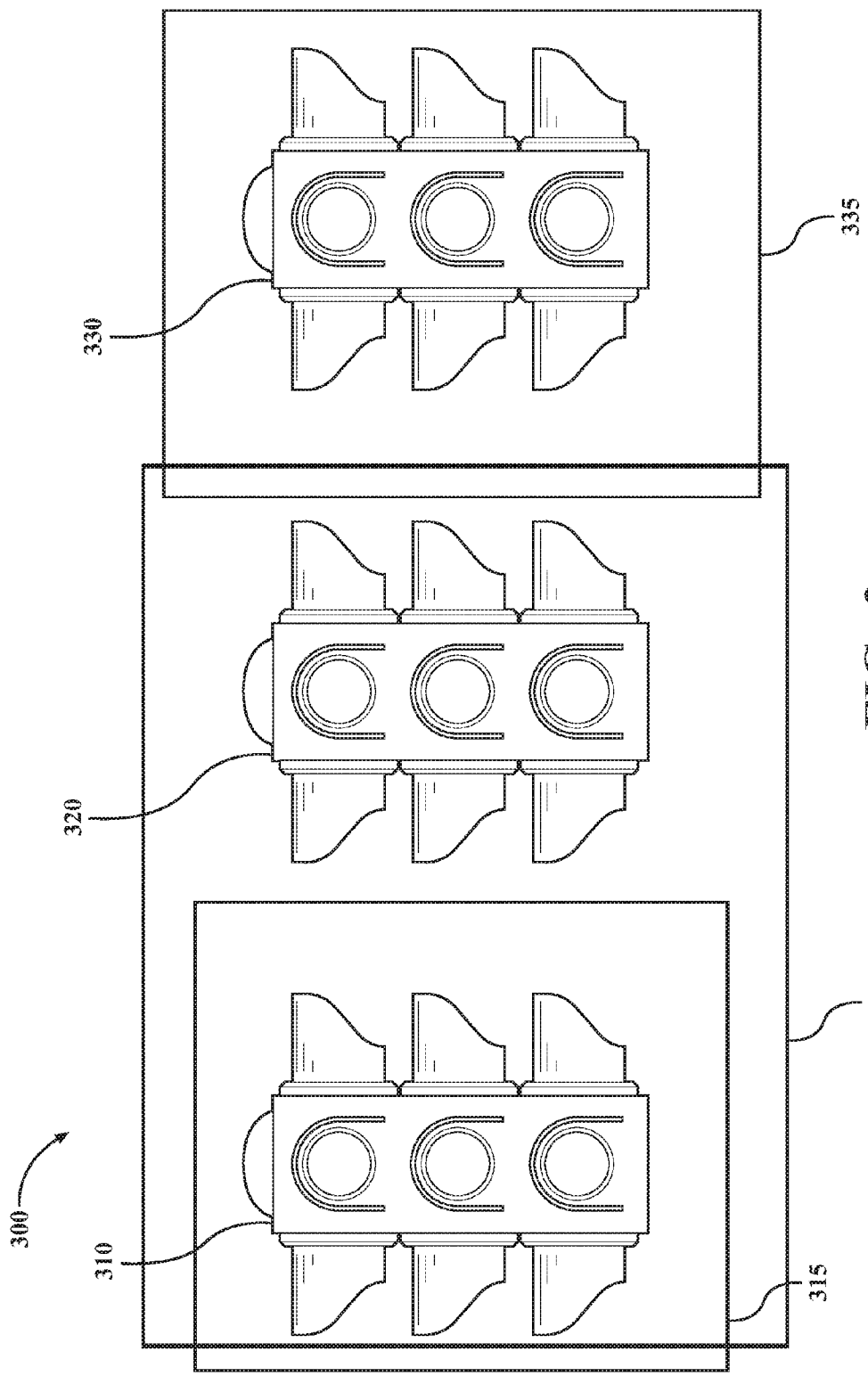
FIG. 3 is a diagram of an embodiment of a view using an expanded region of interest.

FIG. 3 is a diagram of an embodiment of a view 300 using an expanded region of interest. In an embodiment, when traffic lights are around a curve or at a great distance, the region of interest may be expanded. The expanded regions of interest may overlap. Region of interest 315 may contain traffic light 310. Region of interest 315 may overlap with region of interest 325. Region of interest 325 may contain traffic light 320 and a portion of traffic light 310. Region of interest 325 may overlap with region of interest 315 and region of interest 335. Region of interest 335 may contain traffic light 330. Region of interest 335 may overlap with region of interest 315. In this embodiment, a region of interest may contain several candidates for detection.

Figure 4:
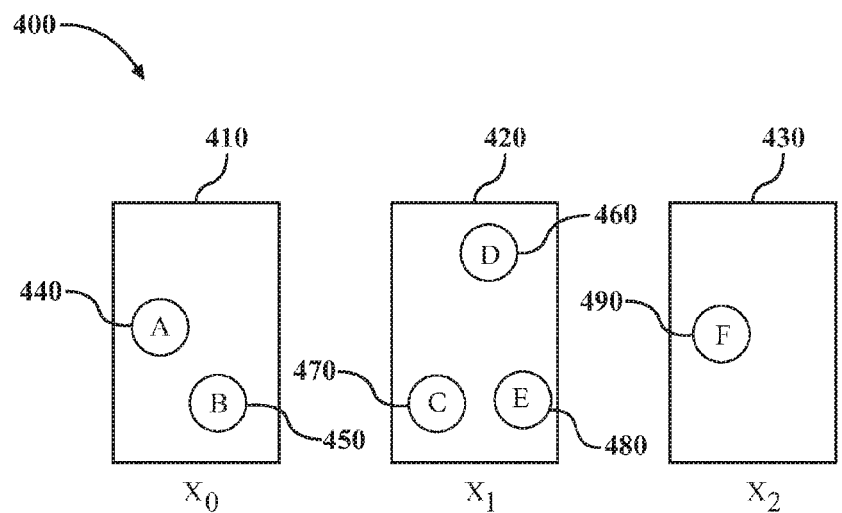
FIG. 4 is a diagram of an embodiment of a plurality of regions of interest and candidates for detection.

FIG. 4 is a diagram of an embodiment of an image 400 of a plurality of regions of interest and candidates for detection. Image 400 may be captured by a camera or other image capture device as a vehicle approaches an area where traffic signals may be present. Region of interest 410 may correspond to region of interest 315. Region of interest 420 may correspond to region of interest 325. Region of interest 430 may correspond to region of interest 335. Region of interest 410 may contain two detections results, candidate A 440 and candidate B 450. Candidate A 440 may be a false positive and candidate B 450 may be a good detection. Region of interest 420 may contain three detection results, candidate D 460, candidate C 470, and candidate E 480. Candidate D 460 may be a good detection. Candidate C 470 may be a detection of candidate B 450 in a different region of interest. Thus, candidate C 470 may be a false positive for region of interest 420. When two regions of interest overlap, similar to region of interest 325 overlapping region of interest 315, the same light may be a candidate in both regions of interest. The light may be a good detection in one region of interest, but a false positive in the other. Region of interest 430 may contain one detection result, candidate F 490. Candidate F 490 may be a good detection.

In an embodiment, a traffic light detection module may be configured to determine a confidence value that a candidate is in a particular state, e.g., red, green, yellow, or occluded. The confidence value may be determined using multiple candidates. In an embodiment, a combination of candidates including one candidate from each region of interest may be selected and then a confidence score for each candidate of the combination may be determined for each possible state (e.g., green, yellow, red, occluded). The combination with the highest confidence scores for a particular state is selected and the particular state is the determined state.

For example, using the candidates of FIG. 4, the combinations evaluated may include: candidate A 440, candidate C 470, and candidate F 490; candidate A 440, candidate D 460, and candidate F 490; candidate A 440, candidate E 480, and candidate F 490; candidate B 450, candidate C 470, and candidate F 490; candidate B 450, candidate D 460, and candidate F 490; and candidate B 450, candidate E 480, and candidate F 490. Each combination may be evaluated for each possible state of the traffic light. Thus, in this example with six possible combinations, four states per combination, and three candidates per combination, seventy-two confidence scores may be calculated. The combination with the highest total of confidence scores will be selected as the current state of the traffic lights.

Confidence scores may be determined based on a number of factors. For example, the confidence score may be determined based on any combination of a probability that the light is in a current state; the expected distance between two lights; a rule set that traffic lights at an intersection should have the same color; and a state transition probability.

In an embodiment, a confidence score $C(x)$ for a particular combination of candidates may be calculated as:

$$C(x)=P(x)+\lambda Q(x)+\mu R(x)+\eta S(X)$$

Where $P(x)=\Sigma_{i=0}^{2}p(x_i)$. $p(x_i)$ may be the probability for i-th candidate having state $x_i$. In an embodiment, based upon the amount of time a traffic light is in a given state, a probability may be determined that the traffic light is in the given state. For example, a traffic light cycle may be 100 seconds. The traffic light may be green for 50 seconds, red for 40 seconds and yellow for 10 seconds. In this example, the probability of a green light state may be 0.5, the probability of a red light state may be 0.4 and the probability of a yellow light state may be 0.1.

Where $Q(x)=-\Sigma_{(i,j)}(d(x_i,x_j)-\bar{d}(x_i,x_j))^2$. $d(x_i,x_j)$ may be the measured spatial distance between the i-th and the j-th candidates, and $\bar{d}(x_i, x_j)$ may be the expected distance between the i-th and the j-th candidates. The expected distance may be retrieved from a data storage. The data storage may in a local memory in the vehicle or may be in a remote memory. The expected distance may be a previously measured distance between two traffic lights at the intersection. For example, the currently measured distance (using the image captured by the camera or other image capture device) between two candidates is compared to a previously measured distance between two traffic lights at the intersection. The currently measured distance may be determined by counting pixels between two candidates in a captured image or some other method for determining distance using a captured image.

Where $R(x)=\Sigma_{(i,j)} R_{i,j}(x_i, x_j)$. $R_{i,j}(x_i,x_j)=0$ if $x_i \neq x_j$; and $R_{i,j}(x_i, x_j)=1$ if $x_i=x_j(i,j) \in$ rule set. In an embodiment, a rule of the rule set may state that the i-th and j-th candidates shall have same state (e.g., both lights at an intersection that face the same direction should be red).

Where $S(x)=\Sigma_{i=0}^{2} s(x_i, x_{i,-1})$. $s(x_i, x_{i,-1})$ may be the state transition probability between current state $x_i$ and previous state $x_{1,-1}$. State transition property is further described in conjunction with FIG. 5.

λ, μ, and η may be weighting parameters associated with the various factors used in calculating the confidence score. In an embodiment, λ may be higher if the distance between the traffic lights has been previously measured and lowered if there is less confidence in the actual distance between the traffic lights. In an embodiment, μ may be higher if the confidence in the rule being used is higher, e.g., the rule that two traffic lights in two adjacent lanes facing the same direction have the same color at the same time. In an embodiment, η may be higher if the timing of the traffic light changes are previously known. In other embodiments, more or less factors may be considered when calculating a confidence score. In other embodiments, more or less or no weighting parameters may be considered when calculating a confidence score.

Figure 5:
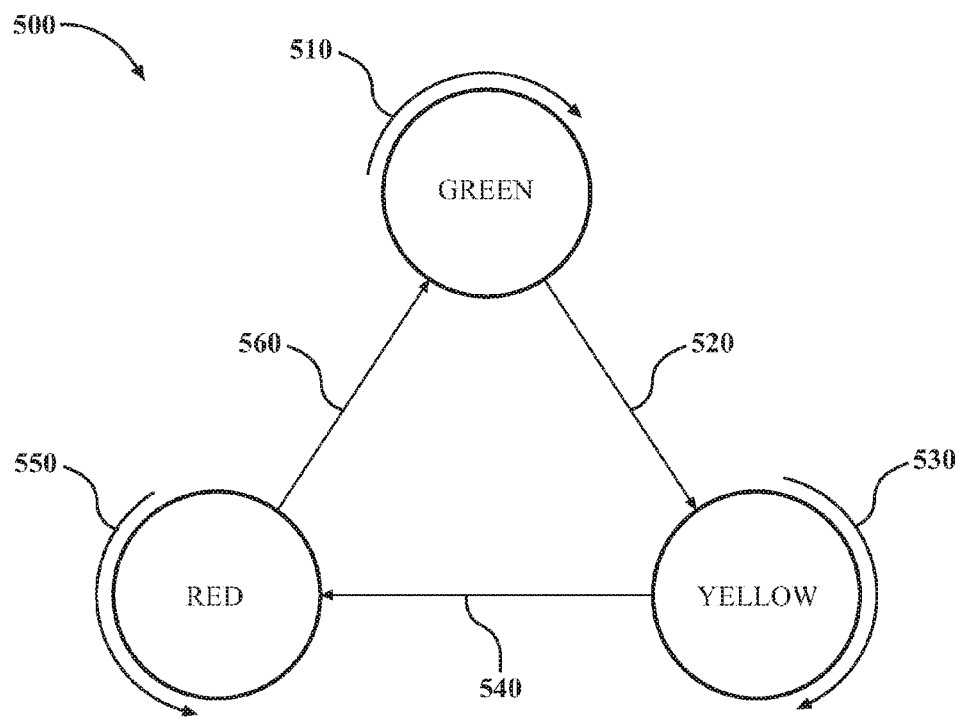
FIG. 5 is a diagram of an embodiment of a traffic light state transition graph.

FIG. 5 is a diagram of an embodiment of a traffic light state transition graph 500. The state transition graph 500 may be used to determine probabilities of a current state of a traffic light based on a previous state of the traffic light. The probability the light will be green if it was previously green may be represented by arrow 510. Arrow 510 may be associated with a probability of 0.8, e.g., 80% of the time the light will be green if the previous state of the light was green. The probability the light will be yellow if it was previously green may be represented by arrow 520. Arrow 520 may be associated with a probability of 0.2, e.g., 20% of the time the light will be yellow if the previous state of the light was green. The probability the light will be yellow if it was previously yellow may be represented by arrow 530. Arrow 530 may be associated with a probability of 0.6, e.g., 60% of the time the light will be yellow if the previous state of the light was yellow. The probability the light will be red if it was previously yellow may be represented by arrow 540. Arrow 540 may be associated with a probability of 0.4, e.g., 40% of the time the light will be red if the previous state of the light was yellow. The probability the light will be red if it was previously red may be represented by arrow 550. Arrow 550 may be associated with a probability of 0.7, e.g., 70% of the time the light will be red if the previous state of the light was red. The probability the light will be green if it was previously red may be represented by arrow 560. Arrow 560 may be associated with a probability of 0.3, e.g., 30% of the time the light will be green if the previous state of the light was red.

Figure 6:
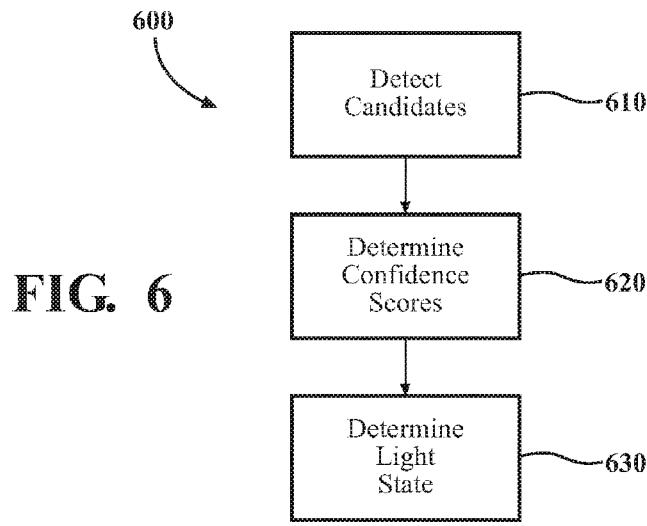
FIG. 6 is a flow diagram of an embodiment of a method for traffic light detection.

FIG. 6 is a flow diagram of an embodiment of a method 600 for traffic light detection. The method 600 begins at block 610 when a traffic light detection system detects several candidates for traffic light detection. Detection of candidates may be based on an analysis of an image captured by an image capture device. The image capture device may be part of a vehicle. The image may be captured as the vehicle approaches an intersection or other area where a traffic light may be present. Candidates may be determined based on colors of pixels in the captured image, a location of the vehicle when the image is captured, or some other detection process.

At block 620, a traffic light detection module may determine confidence scores for combinations of the candidates. In an embodiment, several traffic lights may be present at an intersection. There may be a corresponding region of interest for each of the areas where a traffic light could be found. In each region of interest, one or more candidates may be determined. The traffic light detection module may determine combinations of the candidates comprising one candidate from each region. Each combination may then be evaluated to determine confidence scores using each possible state of the traffic light.

At block 630, the combination with the highest combined confidence score may be determined. The traffic light state associated with the combination with the highest combined confidence score may then be determined to be the current state of the traffic light.

Figure 7:
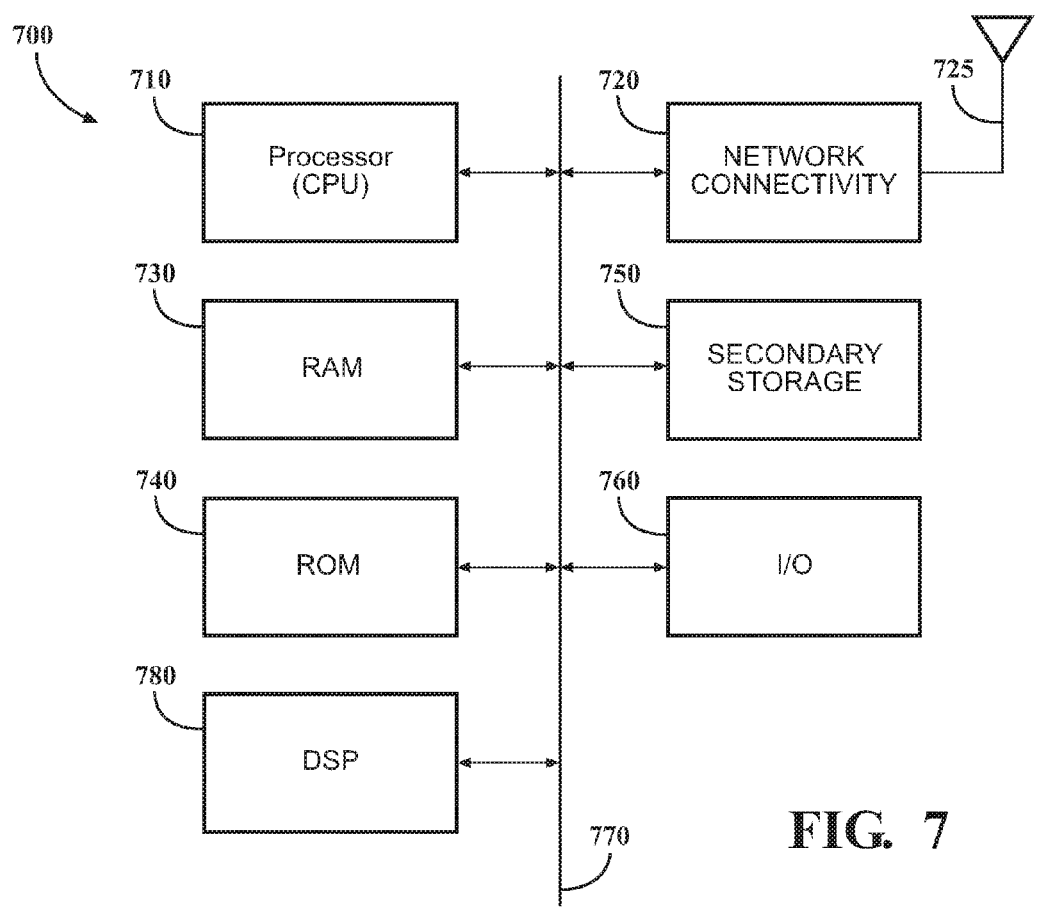
FIG. 7 is a diagram of an embodiment of a system for traffic light detection.

FIG. 7 illustrates an example of a system 700 that includes a processor 710 suitable for implementing one or more embodiments disclosed herein. The processor 710 may control the overall operation of the device. In an embodiment, the system 700 may be configured as a traffic light detection system as described in conjunction with FIGS. 3, 4, and 5. System 700 may be part of an autonomous vehicle utilizing the traffic light detection system.

In addition to the processor 710 (which may be referred to as a central processor unit or CPU), the system 700 might include network connectivity devices 720, random access memory (RAM) 730, read only memory (ROM) 740, secondary storage 750, and input/output (I/O) devices 760. These components might communicate with one another via a bus 770. In some cases, some of these components may not be present or may be combined in various combinations with one another or with other components not shown. These components might be located in a single physical entity or in more than one physical entity. Any actions described herein as being taken by the processor 710 might be taken by the processor 710 alone or by the processor 710 in conjunction with one or more components shown or not shown in the drawing, such as a digital signal processor (DSP) 780. Although the DSP 780 is shown as a separate component, the DSP 780 might be incorporated into the processor 710.

The processor 710 executes instructions, codes, computer programs, or scripts that it might access from the network connectivity devices 720, RAM 730, ROM 740, or secondary storage 750 (which might include various disk-based systems such as hard disk, floppy disk, or optical disk). While only one CPU 710 is shown, multiple processors may be present. Thus, while instructions may be discussed as being executed by a processor, the instructions may be executed simultaneously, serially, or otherwise by one or multiple processors. The processor 710 may be implemented as one or more CPU chips and may be a hardware device capable of executing computer instructions. In an embodiment, the processor 710 may be configured to execute instructions that cause a traffic light detection system to perform the method of FIG. 6.

The network connectivity devices 720 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 720 may enable the processor 710 to communicate with the Internet or one or more telecommunications networks or other networks from which the processor 710 might receive information or to which the processor 710 might output information. The network connectivity devices 720 might also include one or more transceiver components 725 capable of transmitting and/or receiving data wirelessly.

The RAM 730 might be used to store volatile data and perhaps to store instructions that are executed by the processor 710. The ROM 740 is a non-volatile memory device that typically has a smaller memory capacity than the memory capacity of the secondary storage 750. ROM 740 might be used to store instructions and perhaps data that are read during execution of the instructions. Access to both RAM 730 and ROM 740 is typically faster than to secondary storage 750. The secondary storage 750 is typically comprised of one or more disk drives or tape drives and might be used for non-volatile storage of data or as an over-flow data storage device if RAM 730 is not large enough to hold all working data. Secondary storage 750 may be used to store programs that are loaded into RAM 730 when such programs are selected for execution.

The I/O devices 760 may include liquid crystal displays (LCDs), touch screen displays, keyboards, keypads, switches, dials, mice, track balls, voice recognizers, card readers, paper tape readers, printers, video monitors, image capture devices, and/or other well-known input/output devices. Also, the transceiver 725 might be considered to be a component of the I/O devices 760 instead of or in addition to being a component of the network connectivity devices 720.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium.

What is claimed is:

1. A device for traffic light detection comprising:
 a memory configured to store information, the information comprising first traffic light data of a first traffic light and second traffic light data of a second traffic light; and
 a traffic light detection module configured to:
  receive an image comprising a first candidate and a second candidate;
  receive the first traffic light data and the second traffic light data;
  determine a first region of interest based, at least in part, on the first traffic light data, the first region of interest comprising the first candidate;
  determine a second region of interest based, at least in part, on the second traffic light data, the second region of interest comprising the second candidate; and
  determine a first confidence score for a first state of the first candidate, the first confidence score based, at least in part, on a first spatial relationship factor between the first candidate and the second candidate.

2. The device of claim 1, wherein the traffic light detection module is further configured to:
 compare the first confidence score to one or more additional confidence scores; and
 determine a traffic light state for the first traffic light and the second traffic light, wherein the traffic light state corresponds to a greatest confidence score selected from the group consisting of the first confidence score and one of the one or more additional confidence scores.

3. The device of claim 1, wherein the traffic light detection module is further configured to:
    determine a first distance between the first candidate and the second candidate, the first distance based, at least in part, on the image; and
    determine a second distance, the second distance based, at least in part, on the first traffic light data and the second traffic light data,
    wherein the first spatial relationship factor is determined based, at least in part, on the first distance and the second distance.

4. The device of claim 1, wherein the traffic light detection module is further configured to:
    determine a first probability that the first candidate is in the first state, the first probability based, at least in part, an amount of time the first traffic light is in the first state, wherein the first confidence score is further based on the first probability.

5. The device of claim 1, wherein the traffic light detection module is further configured to:
    determine whether a first rule is satisfied;
    increase the first confidence score if the first rule is satisfied; and
    not increase the first confidence score if the first rule is not satisfied.

6. The device of claim 5, wherein the first rule is that the first state is the same as a second state of the second candidate.

7. The device of claim 1, wherein the traffic light detection module is further configured to:
    determine a state transition probability of the first candidate, wherein the first confidence score is further based on the state transition probability.

8. The device of claim 1, wherein the traffic light detection module is further configured to assign a first weighting parameter to the first spatial relationship factor.

9. The device of claim 1, wherein the first state is selected from the group consisting of: red, green, yellow, and occluded.

10. A method for traffic light detection, the method comprising:
    storing information comprising first traffic light data of a first traffic light and second traffic light data of a second traffic light;
    receiving, from an image capture device, an image comprising a first candidate and a second candidate;
    receiving the first traffic light data and the second traffic light data;
    determining, by a traffic light detection module, a first region of interest based, at least in part, on the first traffic light data, the first region of interest comprising the first candidate;
    determining, by the traffic light detection module, a second region of interest based, at least in part, on the second traffic light data, the second region of interest comprising the second candidate; and
    determining, by the traffic light detection module, a first confidence score for a first state of the first candidate, the first confidence score based, at least in part, on a first spatial relationship factor between the first candidate and the second candidate.

11. The method of claim 10 further comprising:
    comparing the first confidence score to one or more additional confidence scores; and
    determining a traffic light state for the first traffic light and the second traffic light, wherein the traffic light state corresponds to a greatest confidence score selected from the group consisting of the first confidence score and one of the one or more additional confidence scores.

12. The method of claim 10 further comprising:
    determining a first distance between the first candidate and the second candidate, the first distance based, at least in part, on the image; and
    determining a second distance, the second distance based, at least in part, on the first traffic light data and the second traffic light data,
    wherein the first spatial relationship factor is determined based, at least in part, on the first distance and the second distance.

13. The method of claim 10 further comprising:
    determining a first probability that the first candidate is in the first state, the first probability based, at least in part, an amount of time the first traffic light is in the first state, wherein the first confidence score is further based on the first probability.

14. The method of claim 10 further comprising:
    determining whether a first rule is satisfied;
    increasing the first confidence score if the first rule is satisfied; and
    not increasing the first confidence score if the first rule is not satisfied.

15. The method of claim 14, wherein the first rule is that the first state is the same as a second state associated with the second candidate.

16. The method of claim 10 further comprising:
    determining a state transition probability of the first candidate, wherein the first confidence score is further based on the state transition probability.

17. The method of claim 10 further comprising:
    assigning a first weighting parameter to the first spatial relationship factor.

18. The method of claim 10, wherein the first state is a member of the group consisting of:
    red, green, yellow, and occluded.

19. The method of claim 18 further comprising:
    determining a current state of the first traffic light and the second traffic light, based at least in part, on a highest confidence score of a plurality of confidence scores, wherein the first confidence score is a member of the plurality of confidence scores.

20. A method for traffic light detection, the method comprising:
    receiving, from an image capture device, an image comprising a first candidate and a second candidate;
    receiving first traffic light data of a first traffic light and second traffic light data of a second traffic light;
    determining, by a traffic light detection module, a first region of interest based, at least in part, on the first traffic light data, the first region of interest comprising the first candidate;
    determining, by the traffic light detection module, a second region of interest based, at least in part, on the second traffic light data, the second region of interest comprising the second candidate;
    determining, by the traffic light detection module, a first spatial relationship factor between the first candidate and the second candidate;
    determining, by the traffic light detection module, a first probability that the first candidate is in a first state;

determining, by the traffic light detection module, whether the first candidate satisfies a first rule;
determining, by the traffic light detection module, a state transition probability of the first candidate; and
determining, by the traffic light detection module, a first confidence score based, at least in part on, the first spatial relationship factor, the first probability, whether the first candidate satisfies the first rule, and the state transition probability,
wherein the first confidence score indicates a confidence that the first candidate is in the first state.

\* \* \* \* \*